United States Patent
Zhang et al.

(10) Patent No.: US 9,239,013 B2
(45) Date of Patent: Jan. 19, 2016

(54) COMBUSTION TURBINE PURGE SYSTEM AND METHOD OF ASSEMBLING SAME

(75) Inventors: Hua Zhang, Greer, SC (US); Gilbert Otto Kraemer, Greer, SC (US); Douglas S. Byrd, Greer, SC (US)

(73) Assignee: General Electric Company, Schenectady, NY (US)

( * ) Notice: Subject to any disclaimer, the term of this patent is extended or adjusted under 35 U.S.C. 154(b) by 1029 days.

(21) Appl. No.: 12/983,392

(22) Filed: Jan. 3, 2011

(65) Prior Publication Data

US 2012/0167547 A1    Jul. 5, 2012

(51) Int. Cl.
 *F02C 7/22* (2006.01)
 *F02C 7/232* (2006.01)
 *F02C 9/40* (2006.01)
 *F23K 5/18* (2006.01)
 *F01D 25/00* (2006.01)

(52) U.S. Cl.
 CPC ............... *F02C 9/40* (2013.01); *F01D 25/002* (2013.01); *F02C 7/22* (2013.01); *F02C 7/232* (2013.01); *F23K 5/18* (2013.01); *F05D 2260/602* (2013.01); *F23D 2209/30* (2013.01); *Y10T 29/49229* (2015.01)

(58) Field of Classification Search
 CPC ........ F23D 2209/30; F02C 7/22; F02C 7/232; F02C 9/40
 USPC ........................................... 60/39.094; 431/3
 See application file for complete search history.

(56) References Cited

U.S. PATENT DOCUMENTS

| | | | | |
|---|---|---|---|---|
| 5,369,951 | A  * | 12/1994 | Corbett et al. | 60/39.3 |
| 5,540,045 | A  * | 7/1996  | Corbett et al. | 60/39.3 |
| 5,615,555 | A  * | 4/1997  | Mina | 60/742 |
| 5,826,430 | A  * | 10/1998 | Little | 60/736 |
| 6,145,294 | A  * | 11/2000 | Traver et al. | 60/776 |
| 6,250,065 | B1   | 6/2001  | Mandai et al. | |
| 6,367,239 | B1 * | 4/2002  | Brown et al. | 60/775 |
| 6,393,827 | B1 * | 5/2002  | Nakamoto | 60/39.094 |
| 7,185,663 | B2 * | 3/2007  | Koch et al. | 134/22.19 |
| 7,296,412 | B2 * | 11/2007 | Hall et al. | 60/772 |
| 2003/0051460 | A1 * | 3/2003 | Miliani et al. | 60/39.094 |
| 2006/0150631 | A1 | 7/2006 | Smith et al. | |
| 2007/0101720 | A1 | 5/2007 | Kunkle et al. | |
| 2007/0101723 | A1 * | 5/2007 | Kunkle et al. | 60/772 |
| 2009/0025396 | A1 * | 1/2009 | Joshi et al. | 60/773 |

OTHER PUBLICATIONS

Lee S. Langston,Introduction to Gas Turbines for Non-Engineers, Published in the Global Gas Turbine News, vol. 37: 1997, No. 2 http://www.ewp.rpi.edu/hartford/~ernesto/F2013/EP/MaterialsforStudents/Hill/Langston-Intro.pdf.*

* cited by examiner

*Primary Examiner* — Phutthiwat Wongwian
*Assistant Examiner* — William Breazeal
(74) *Attorney, Agent, or Firm* — Armstrong Teasdale LLP

(57) ABSTRACT

A method for assembling a rotary machine includes providing at least one combustor assembly that includes at least one fuel nozzle. The method also includes coupling at least one fuel source to the at least one combustor assembly. The method further includes coupling at least one solvent-based purge system in flow communication with the at least one combustor assembly.

8 Claims, 4 Drawing Sheets

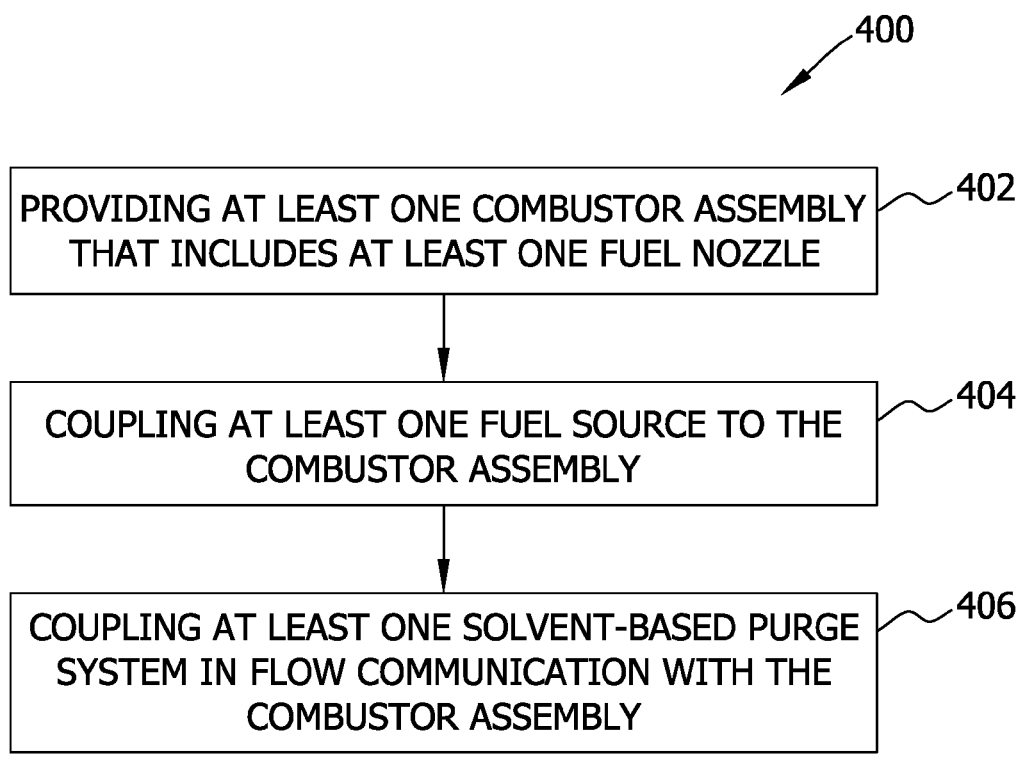

US 9,239,013 B2

COMBUSTION TURBINE PURGE SYSTEM AND METHOD OF ASSEMBLING SAME

BACKGROUND OF THE INVENTION

The embodiments described herein relate generally to rotary machines and, more particularly, to purge systems for use with turbine fuel supply systems.

In some known dual-fuel turbines, the turbine is powered by burning either a gaseous fuel or a liquid fuel. Such turbines have fuel supply systems for both liquid and gaseous fuels, but, generally most dual-fuel turbines do not burn both gaseous and liquid fuels at the same time. Rather, when the turbine operates with liquid fuel, the gaseous fuel supply is removed from service, and, alternatively, when the turbine operates with gaseous fuel, the liquid fuel supply is removed from service. Moreover, some known turbines burn liquid fuel exclusively and have more than one source of liquid fuel, therefore, such known turbines may require periodic liquid fuel source shifting.

In at least some known industrial turbines, a combustion system may have an array of combustor assemblies, each of which includes at least one liquid fuel nozzle and at least one gaseous fuel nozzle. Generally, in such known turbines, combustion is initiated within the combustor assemblies, downstream from the fuel nozzles. Air from a compressor flows around and through the combustor assemblies to provide oxygen for combustion.

Some known existing turbines that are operable with dual-fuels use gaseous fuel as the primary fuel and use liquid fuel as a backup. During burning of gaseous fuel, the liquid fuel nozzles are normally purged using a purge air system. However, to facilitate readiness for a rapid fuel transfer, static liquid fuel may remain in a portion of the system. During those periods when the liquid fuel system is removed from service, the purge air system operates at a higher pressure at the point of flow communication with the liquid fuel system and, as such, air infiltration into a portion of the liquid fuel system is more likely. Such an operating condition may increase a potential for interaction between fuel and air, and subsequently, may increase carbonaceous particulate formation, sometimes referred to as "coking". Thin layers of carbonaceous materials are sometimes referred to as "varnish".

In general, the longer a liquid fuel system remains out of service, the more likely that the static liquid fuel within the turbine compartment will begin to experience carbonaceous particulate precipitation, i.e., coking. Purge air infiltration into the liquid fuel system increases air contact with liquid fuel and the potential for extended air-to-fuel interaction increases as the length of period of time associated with maintaining the fuel system out of service increases. Coking is generally accelerated at temperatures above 93° Celsius (° C.) (200 degrees Fahrenheit (° F.)). Also, liquid fuel carbonaceous particulate precipitation is facilitated at lower temperatures in the presence of oxygen. Considering that some known turbine compartment temperatures operate in excess of 157° C. (315° F.), carbonaceous particulate precipitation is even more likely to occur if infiltrating purge air remains in contact with static liquid fuel for an extended period of time within a heated turbine compartment. Depending on the amount of carbonaceous particulates formation, the potential of having a liquid fuel internal flow passage, including those in the combustion fuel supply valves, nozzles, and fuel nozzle exits, becoming obstructed may increase.

Furthermore, purge air is typically much cooler than the components within the combustor assemblies. Therefore, channeling cool purge air into hot combustor assemblies facilitates unnecessary cooling of the components contained therein, including the liquid fuel nozzles. Such cooling requires additional heat input during subsequent restoration of firing of the combustor assemblies, thereby slowing activities associated restoration of the turbine to service and reducing a thermal efficiency of the turbine.

BRIEF SUMMARY OF THE INVENTION

In one aspect, a method for assembling a rotary machine is provided. The method includes providing at least one combustor assembly that includes at least one fuel nozzle. The method also includes coupling at least one fuel source to the at least one combustor assembly. The method further includes coupling at least one solvent-based purge system in flow communication with the at least one combustor assembly.

In a further aspect, a steam purge system solvent-based purge system for a combustor assembly coupled in flow communication with at least one fuel source is provided. The solvent-based purge system includes at least one of a steam purge system including at least one steam manifold coupled in flow communication with the combustor assembly, and a chemical solvent-based purge system including at least one chemical solvent manifold coupled in flow communication with the combustor assembly.

In another aspect, a turbine engine is provided. The turbine engine includes at least one fuel source. The turbine engine also includes at least one combustor assembly coupled in flow communication with the at least one fuel source. The turbine engine further includes a solvent-based purge system including at least one of a steam purge system including at least one steam manifold coupled in flow communication with the at least one combustor assembly, and a chemical solvent-based purge system including at least one chemical solvent manifold coupled in flow communication with the at least one combustor assembly.

BRIEF DESCRIPTION OF THE DRAWINGS

The embodiments described herein may be better understood by referring to the following description in conjunction with the accompanying drawings.

FIG. 4 is a flow chart illustrating an exemplary method that may be used in assembling a portion of the turbine engine shown in FIG. 1.

DETAILED DESCRIPTION OF THE INVENTION

Figure 1:
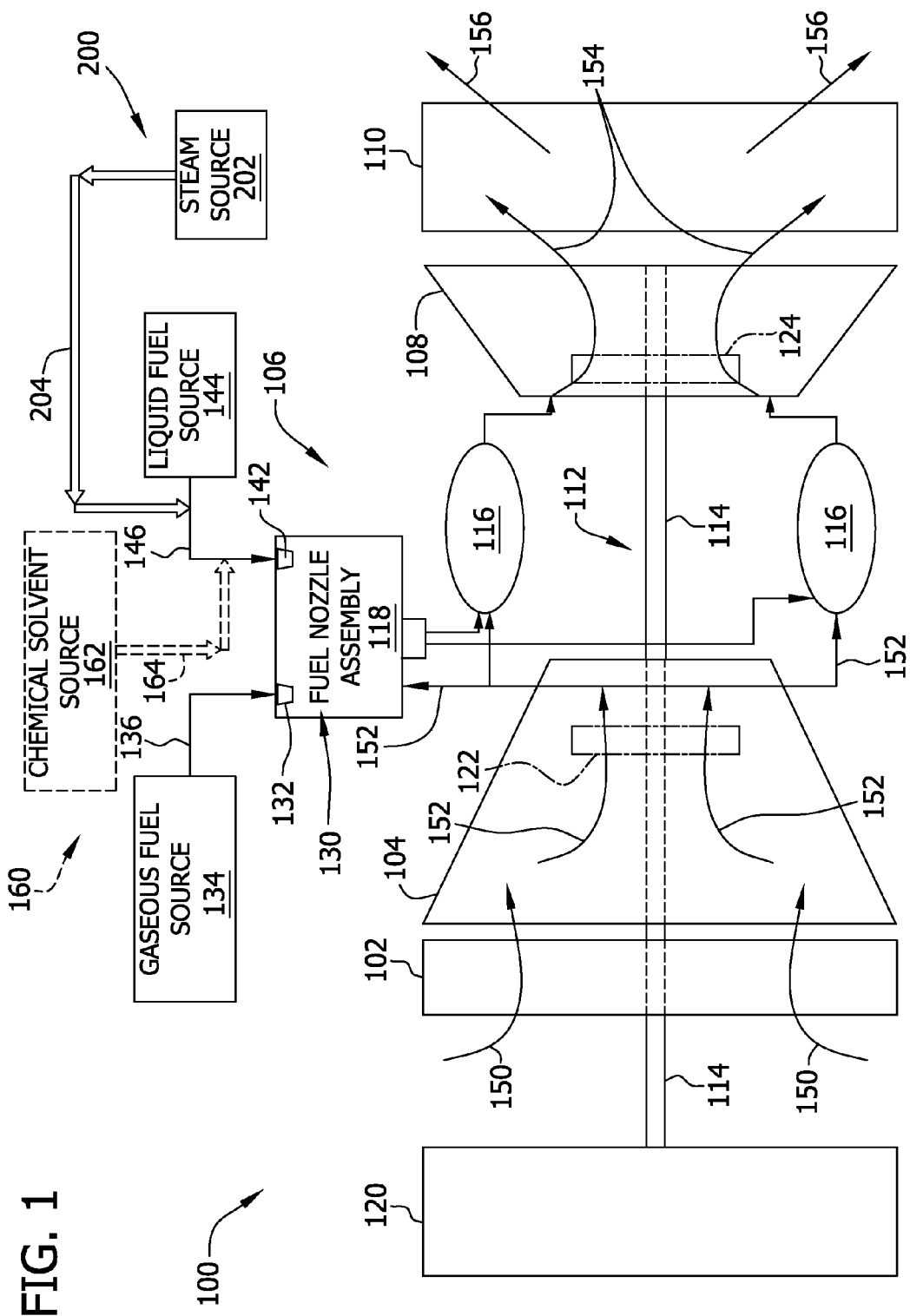
FIG. 1 is schematic diagram of an exemplary turbine engine.

FIG. 1 is a schematic view of an exemplary rotary machine 100, i.e., a turbomachine, and more specifically, a turbine engine. In the exemplary embodiment, rotary machine 100 is a dual-fuel combustion turbine engine. Alternatively, it should be noted that those skilled in the art will understand that other engines, such as those that burn liquid fuel exclusively may be used. In the exemplary embodiment, turbine engine 100 includes an air intake section 102, and a compressor section 104 that is downstream from, and in flow communication with, intake section 102. A combustor section 106 is coupled downstream from, and in flow communication with, compressor section 104, and a turbine section 108 is coupled downstream from, and in flow communication with, combustor section 106. Turbine engine 100 includes an exhaust section 110 downstream from turbine section 108. Moreover, in the exemplary embodiment, turbine section 108 is coupled to compressor section 104 via a rotor assembly 112 that includes a drive shaft 114.

In the exemplary embodiment, combustor section 106 includes a plurality of combustor assemblies, i.e., combustors 116, which are each in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. In the exemplary embodiment, compressor section 104 includes at least one compressor blade assembly 122. Also, in the exemplary embodiment, turbine section 108 includes at least one turbine blade or bucket mechanism 124. Each compressor blade assembly 122 and each turbine bucket mechanism 124 is coupled to rotor assembly 112.

Further, in the exemplary embodiment, each fuel nozzle assembly 118 includes a plurality of fuel nozzles 130. More specifically, each fuel nozzle assembly 118 includes a gaseous fuel nozzle 132 coupled in flow communication with a gaseous fuel source 134 via a gaseous fuel supply manifold 136. Such gaseous fuels are carbonaceous gaseous fuels that enable operation of turbine engine 100 as described herein including, without limitation, clean syngas and natural gas. Also, specifically, each fuel nozzle assembly 118 includes a liquid fuel nozzle 142 coupled in flow communication with a liquid fuel source 144 via a liquid fuel supply manifold 146. Such gaseous fuels are carbonaceous liquid fuels that enable operation of turbine engine 100 as described herein including, without limitation, number 2 diesel fuel oil.

In operation, air intake section 102 channels air 150 towards compressor section 104. Compressor section 104 compresses inlet air 150 via compressor blade mechanisms 122 to higher pressures and temperatures prior to discharging compressed air 152 towards combustor section 106. Compressed air 152 is mixed with fuel (not shown) and ignited within section 106 to generate combustion gases 154 that are channeled downstream towards turbine section 108. Specifically, at least a portion of compressed air 152 is channeled to fuel nozzle assembly 118. Fuel is also channeled to fuel nozzle assembly 118, wherein the fuel is mixed with compressed air 152 and ignited within combustors 116. Combustion gases 154 generated within combustors 116 are channeled downstream towards turbine section 108. After impinging turbine bucket mechanisms 124, thermal energy in combustion gases 154 is converted to mechanical rotational energy that is used to drive rotor assembly 112. Turbine section 108 drives compressor section 104 and/or load 120 via drive shaft 114, and exhaust gases 156 are discharged through exhaust section 110 to ambient atmosphere.

Some embodiments of turbine engine 100 may include a chemical solvent-based purge system 160 (shown in phantom) that includes a chemical solvent supply source 162 (shown in phantom) and a chemical solvent supply manifold 164 (shown in phantom). Chemical solvent supply manifold 164 is coupled in flow communication with liquid fuel nozzle 142 via liquid fuel supply manifold 146. Chemical solvents that may be used with chemical solvent-based purge system 160 include, without limitation, acetone, standard degreasing agents, ammonia, soap solutions, and steam (discussed further below).

In the exemplary embodiment, turbine engine 100 includes a steam purge system 200 that includes a steam supply source 202 and a steam purge supply manifold 204. Steam purge supply manifold 204 is coupled in flow communication with liquid fuel nozzle 142 via liquid fuel supply manifold 146. In the exemplary embodiment, steam purge system 200 uses steam as a solvent and is therefore a solvent-based purge system. Also, in the exemplary embodiment, steam provides a low-cost solvent as compared to those chemical solvents listed above associated with chemical solvent-based purge system 160. Further, steam is conveniently available, is chemically compatible with liquid fuel supply manifold 146 and liquid fuel nozzles 142, and can be easily and safely handled.

In operation, under certain conditions, liquid fuel is initially channeled to liquid fuel nozzle 142, within fuel nozzle assembly 118, from liquid fuel source 144 via liquid fuel supply manifold 146. The liquid fuel is ignited, and subsequently, turbine engine 100 operates on liquid fuel. When a transition between fuels occurs, gaseous fuel is channeled to gaseous fuel nozzle 132, within fuel nozzle assembly 118, from gaseous fuel source 134 via gaseous fuel supply manifold 136. The gaseous fuel is ignited. As the gaseous fuel flow into fuel nozzle assembly 118 is increased, liquid fuel flow into fuel nozzle assembly 118 is decreased.

After liquid fuel injection is stopped, in those embodiments that include chemical solvent-based purge system 160, a chemical solvent (not shown) is channeled from chemical solvent source 162 to liquid fuel nozzles 142 via chemical solvent supply manifold 164 and liquid fuel supply manifold 146. The chemical solvent facilitates removing static liquid fuel from liquid fuel supply manifold 146 and liquid fuel nozzles 142 that may be susceptible to carbonaceous particulate precipitation, or coking and/or varnishing.

Also, after a predetermined period of time of purging with chemical solvents, chemical solvent-based purge system 160 is removed from service and steam purge system 200 is placed into service. Steam purge system 200 channels steam (not shown in FIG. 1) into liquid fuel nozzle 142 via steam purge supply manifold 204 and liquid fuel supply manifold 146. Steam purge system 200 facilitates removing a significant portion of the chemical solvents and further facilitates removing static liquid fuel from liquid fuel supply manifold 146 and liquid fuel nozzles 142 that may be susceptible to carbonaceous particulate precipitation, or coking and/or varnishing. Also, after a predetermined period of time of purging with steam, steam purge system 200 is removed from service. The length of time each purge cycle is in operation can be set to a specific, unvarying time period. Alternatively, the length of time each purge cycle is in operation can be set to permit operation for variable periods of time as a function of parameters that include, without limitation, piping differential pressures or any other variable that indicates head loss due to carbonaceous particulate precipitation. In alternative embodiments that include those turbine engines that burn liquid fuel exclusively, fuel switching between liquid fuel sources may require a similar transition.

Furthermore, during operation of some embodiments of turbine engine 100, under certain operating conditions, such as removal from service, gaseous fuel is initially channeled to gaseous fuel nozzle 132, within fuel nozzle assembly 118, from gaseous fuel source 134 via gaseous fuel supply manifold 136. The gaseous fuel is ignited as described above, and subsequently, a transition between fuels occurs wherein liquid fuel is channeled to liquid fuel nozzle 142, within fuel nozzle assembly 118, from liquid fuel source 144 via liquid fuel supply manifold 146. The liquid fuel is ignited as described above. As the gaseous fuel supply into fuel nozzle assembly 118 is decreased, the liquid fuel supply into fuel nozzle assembly 118 is increased until turbine engine 100 is removed from service. After liquid fuel injection is stopped, chemical solvent-based purge system 160 (if available) and steam purge system 200 are operated as described above.

Moreover, in operation, under certain conditions, such as dual-fuel firing conditions, wherein liquid fuel is used to support gaseous fuel combustion, liquid and gaseous fuels are channeled simultaneously to fuel nozzle assembly 118. Subsequently, after liquid fuel combustion support is no longer necessary, liquid fuel flow to fuel nozzle assembly 118 is decreased and terminated. After stopping liquid fuel injection, chemical solvent-based purge system 160 (if available) and steam purge system 200 are operated as described above.

Figure 2:
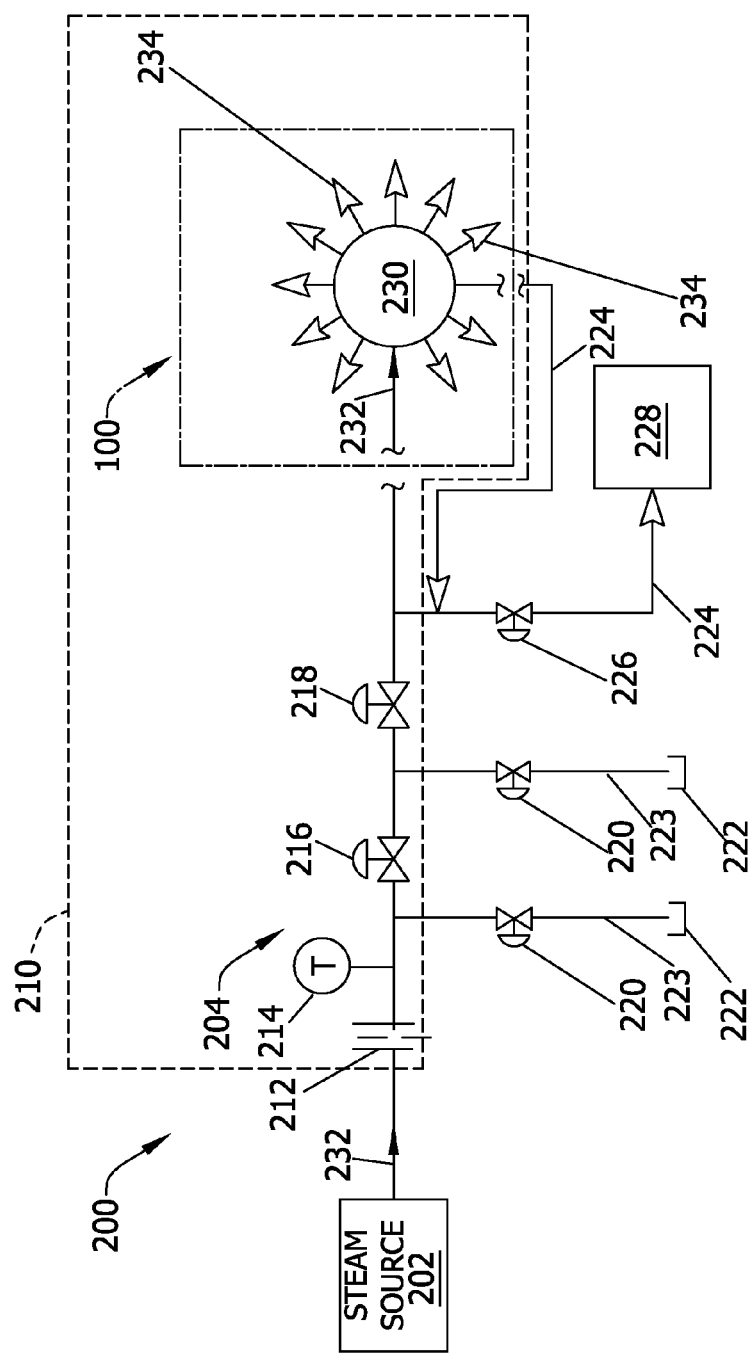
FIG. 2 is schematic diagram of an exemplary steam purge system that may be used with the turbine engine shown in FIG. 1.

FIG. 2 is schematic diagram of steam purge system 200. In the exemplary embodiment, turbine engine 100 is positioned within a turbomachine compartment, i.e., a turbine engine compartment 210. Also, in the exemplary embodiment, steam source 202 is a portion of a heat recovery steam generator (HRSG). It should be noted that HRSGs may accompany turbomachines such as turbine engine 100. Alternatively, steam source 202 may be any steam source that enables operation of steam purge system 200 as described herein.

Further, in the exemplary embodiment, steam purge manifold 204 includes a flow measurement device 212 such as, without limitation, a flow orifice. Steam purge manifold 204 also includes a temperature measurement instrument 214 such as, without limitation, an inserted thermocouple. Moreover, in the exemplary embodiment, steam purge manifold 204 also includes an upstream control valve 216 and a downstream stop valve 218, wherein valves 216 and 218 are operated by a control system (not shown). In some alternative embodiments, the order of control valve 216 and stop valve 218 may be reversed. Also, in some alternative embodiments, stop valve 218 may manually operable. Steam purge manifold 204 also includes a plurality of header drain devices, i.e., drain valves 220, which are remotely-operated and/or locally-operated to remove liquid water from manifold 204. To facilitate temperature and humidity control within turbine engine compartment 210, each drain valve 220 is coupled to an external discharge receptacle 222 via a drain line 223. Drain lines 223 and drain valves 220 are positioned externally to turbine engine compartment 210 to facilitate reducing in coking within drain lines 223.

Moreover, in the exemplary embodiment, steam purge system 200 includes a drain header 224 and a drain valve 226. Drain valve 226 is remotely operated and/or locally operated, and drain header 224 is coupled in flow communication with a retention receptacle 228 that holds oil-contaminated water. Drain header 224 and drain valve 226 are positioned externally to turbine engine compartment 210 to facilitate reducing in coking within drain header 224.

Also in the exemplary embodiment, steam purge system 200 includes a fuel nozzle steam supply manifold 230 that is coupled in flow communication with steam purge manifold 204 and with each liquid fuel nozzle 142 in each fuel nozzle assembly 118 (both shown in FIG. 1).

In operation, after liquid fuel flow through each liquid fuel nozzle 142 is stopped, and chemical solvent-based purge system 160 (not shown in FIG. 2), if available, is removed from service, stop valve 218 is opened and control valve 216 is modulated to channel steam flow 232 from steam source 202 to manifold 230. In the exemplary embodiment, steam flow 232 is channeled into steam purge manifold 204 and manifold 230 at a predetermined steam flow rate to facilitate reducing a potential for a combustion spike due to a rapid injection of residual liquid fuel into combustors 116 during gaseous fuel operation. Steam flow 232 is modulated through coordinated operation of flow measurement device 212 and control valve 216. Steam flow 234 into each liquid fuel nozzle 142 removes residual liquid fuel therein with a solvent action and pushes the residual-fuel into liquid fuel nozzles 142 for combustion within combustors 116.

In the exemplary embodiment, steam flows 232 and 234 are maintained for a predetermined period of time to facilitate substantially removing all residual liquid fuel. After the predetermined period of time has passed, control valve 216 and stop valve 218 are closed to reduce steam flows 232 and 234 to substantially zero. Also, drain valves 220 and 226 are opened to facilitate draining and blowing down of drain lines 223 and drain header 224, thereby using residual steam pressure in manifold 204 and manifold 230 to remove residual condensate and liquid fuel. Alternatively, drain valves 220 and 226 may be opened prior to valves 216 and 218 being closed to facilitate a more robust blowdown of drain lines 223 and header 224. Also, alternatively, a passive air purge using at least a portion of air flow 152 (shown in FIG. 1) from compressor section 104 (shown in FIG. 1) could follow steam purging operations. Further, alternatively, prior to fully opening control valve 216 and/or stop valve 218, a controlled release of steam may be allowed to flow through header drain valve 220 upstream if valve 216 to facilitate warming at least a portion of steam supply manifold 204 and reducing formation of condensate therein. Moreover, alternatively, extended steam purging operations may continue to support power generation augmentation of turbine engine 100 through increased mass flow in combustion gases 154 (shown in FIG. 1).

Figure 3:
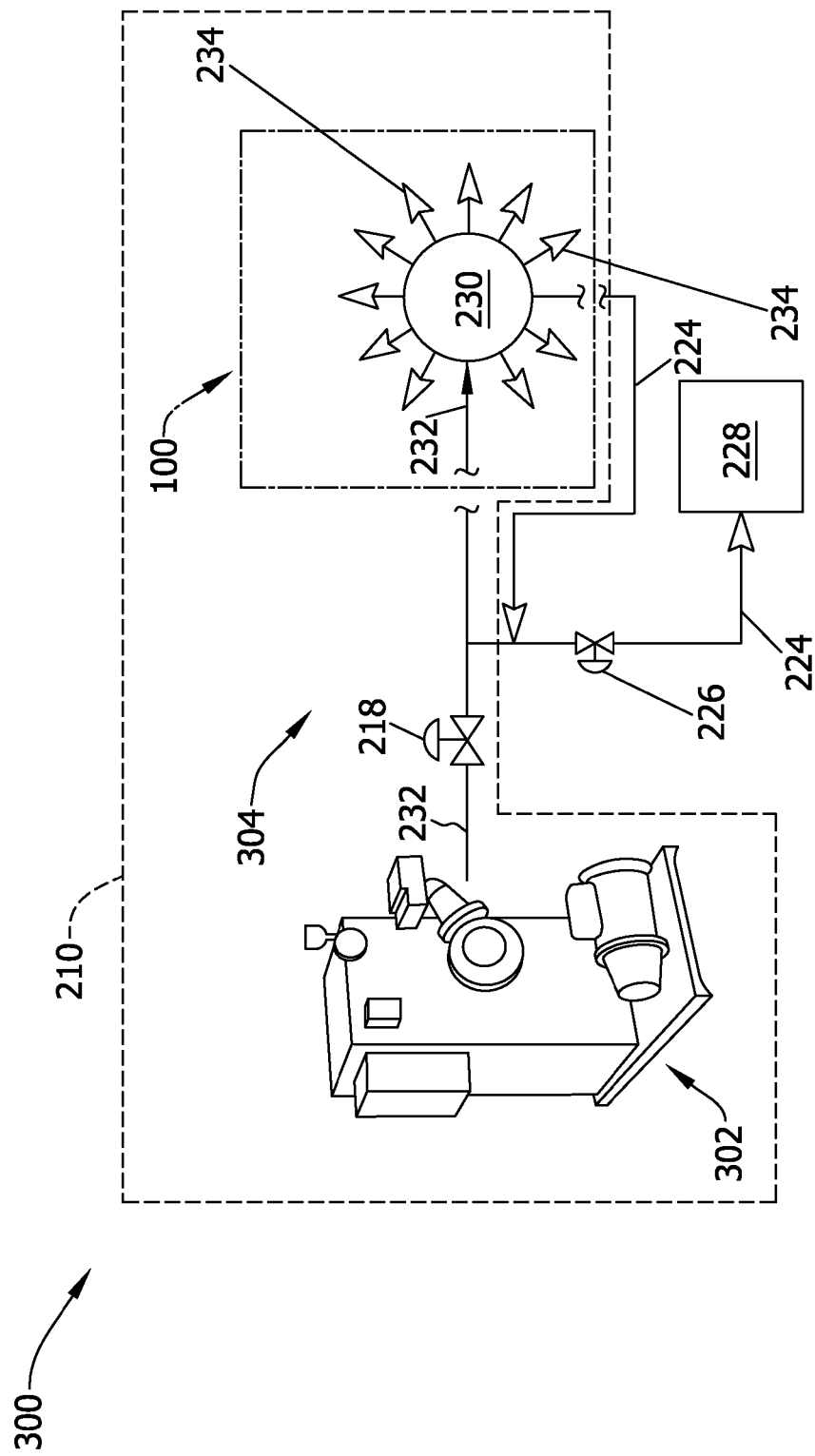
FIG. 3 is a schematic diagram of an alternative steam purge system that may be used with the turbine engine shown in FIG. 1.

FIG. 3 is a schematic diagram of an alternative steam purge system 300. In this alternative exemplary embodiment, an auxiliary boiler 302 is coupled in flow communication with fuel nozzle steam supply manifold 230 via a steam purge supply manifold 304. Also, in this alternative embodiment, auxiliary boiler 302 is an electric steam generator that includes sufficient apparatus and controls to generate steam at sufficient temperatures, pressures, and steam flow rates 232 and 234 to remove residual liquid fuel as described herein. Auxiliary boiler 302 is any commercially-available steam generator that enables operation of steam purge system 300 as described herein. Moreover, auxiliary boiler 302 is positioned adjacent to turbine engine 100 within turbine engine compartment 210. Therefore, only stop valve 218, drain valve 226, and drain header 224 are used external to auxiliary boiler 302. Operation of steam purge system 300 is similar to operation of steam purge system 200 as described above, however, auxiliary boiler 302 is placed into operation just prior to stopping liquid fuel operations. Moreover, the close proximity of steam generator 302 to turbine engine 100 facilitates short-notice energization of steam generator 302.

In this alternative embodiment, auxiliary boiler 302 may be used for new construction as well as retrofits of existing turbine engines 100. Auxiliary boiler 302 is coupled in flow communication to an existing water source (not shown) and an existing electrical power source (not shown). In at least some embodiments, turbine engine compartment 210 is space-constrained, i.e., additional equipment with large physical footprints may be difficult to install within turbine engine compartment 210. Therefore, in at least some embodiments, auxiliary boiler 302 will have dimensions in the range of approximately 60 centimeters (cm) (24 inches (in.)) to approximately 120 cm (47 in.) by approximately 50 cm (20 in.) to approximately 100 cm (39 in.) and approximately 80 cm (31 in.) to 150 cm (59 in.) tall. In the exemplary embodiment, auxiliary boiler 302 has a small footprint that is approximately 91 cm (36 in.) by approximately 61 cm (24 in.) and approximately 91 cm (36 in.) tall.

FIG. 4 is a flow chart illustrating an exemplary method 400 used in assembling a portion of turbine engine 100 (shown in FIGS. 1, 2, and 3). In the exemplary embodiment, at least one combustor assembly 116 (shown in FIG. 1) that includes at least one fuel nozzle 142 (shown in FIG. 1) is provided 402. Also, in the exemplary embodiment, at least one fuel source 144 (shown in FIG. 1) is coupled 404 to combustor assembly 116. Further, in the exemplary embodiment, at least one solvent-based purge system, i.e., chemical solvent-based purge system 160 9 shown in FIG. 1) and/or steam purge system 200/300 (shown in FIGS. 2 and 3, respectively) is coupled 406 in flow communication with combustor assembly 116.

Embodiments provided herein facilitate the assembly and operation of steam purge systems with turbine engines having dual-fuel or liquid fuel combustion features. Such steam purge system reduces carbonaceous particulate precipitation, or coking on the inner surfaces of liquid fuel lines and liquid fuel nozzles. Reducing coking facilitates extending operation of liquid fuel nozzles between cleaning maintenance as a result of reducing fouling of the nozzles. Also, such reductions in fouling increase reliability of the turbine engine due to a lower probability of liquid fuel flow restrictions. Extending periods between maintenance activities such as cleaning the liquid fuel nozzles reduces turbine engine outage periods and maintenance costs. The embodiments provided herein also facilitate readiness for a rapid fuel transfer from liquid fuel to gaseous fuel by purging liquid fuel from those portions of the combustor assemblies prone to static, residual liquid fuel residing therein. Furthermore, high temperature steam is more effective than relatively cooler air in removing fuel and composites from the walls of the combustor assembly components due to emulsification/dissolving action. Also, high temperature steam facilitates inducing lower stresses and reducing restart time of the combustor assemblies by decreasing unnecessary cooling of the components contained therein, including the liquid fuel nozzles, thereby decreasing a need for additional heat input during subsequent restoration of firing of the combustor assemblies.

Described herein are exemplary embodiments of methods and apparatus that facilitate the assembly and operation of combustion turbine engines. Specifically, coupling a steam purge system in flow communication with liquid fuel nozzles facilitates removing of static liquid fuel from turbine compartments that may be susceptible to carbonaceous particulate precipitation, or coking on the inner surfaces of the liquid fuel lines and the liquid fuel nozzles. Reducing coking of the liquid fuel components facilitates increasing the reliability of the combustion turbine engine by decreasing fuel system cleaning activities including valve disassembly and fuel nozzle replacement. Therefore, reducing coking of the liquid fuel system facilitates reducing operational maintenance costs. Also, reducing such coking facilitates increasing the thermal efficiency of the combustion turbine by reducing a need to purge the liquid fuel system with cooled air from the compressor, thereby reducing a need to divert combustion air from gaseous fuel combustion and reducing unnecessary cooling of internal turbine components that subsequently will require reheating. Further, a reduction in coking facilitates the use of smaller liquid fuel nozzles with smaller clearances and tolerances with a reduction in a probability of pluggage or fuel spray quality, thereby facilitating a reduction in air-atomized assisted combustion. Moreover, such improved liquid fuel nozzle with reduced air-atomization facilitates a reduction in potential NOx formation.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. A solvent-based purge system for a combustor assembly including a fuel nozzle assembly that has a liquid fuel nozzle coupled in flow communication with a liquid fuel supply manifold and at least one fuel source, said solvent-based purge system comprising:

a steam purge system comprising a steam supply source and at least one steam manifold coupleable directly to, and upstream from, the liquid fuel supply manifold, to channel steam from said steam supply source to the liquid fuel nozzle via said at least one steam manifold and the liquid fuel supply manifold; and a chemical solvent-based purge system comprising a chemical solvent supply source and at least one chemical solvent manifold coupleable directly to, and upstream from, the liquid fuel supply manifold to channel chemical solvent from said chemical solvent supply source to the liquid fuel nozzle via said at least one chemical solvent manifold and-said the liquid fuel supply manifold, wherein said steam purge system is operable after said chemical solvent-based purge system to facilitate removing chemical solvent from the liquid fuel supply manifold and the liquid fuel nozzle using steam channeled from said steam supply source via said at least one steam manifold.

2. The solvent-based purge system in accordance with claim 1, wherein said steam supply source comprises a steam generator comprising at least one of:

a heat recovery steam generator; and an auxiliary boiler.

3. The solvent-based purge system in accordance with claim 1, further comprising at least one drain device coupleable in flow communication with said at least one steam manifold and positionable between said steam supply source and the combustor assembly.

4. The solvent-based purge system in accordance with claim 3, wherein said at least one drain device is positionable external to a turbomachine compartment having at least one turbomachine positioned within the compartment.

5. A turbine engine comprising:

at least one fuel source;

a liquid fuel supply manifold coupled in flow communication with said at least one fuel source;

at least one combustor assembly coupled in flow communication with said liquid fuel supply manifold, said at least one combustor assembly comprising a fuel nozzle assembly comprising a liquid fuel nozzle; and a solvent-based purge system comprising:

a steam purge system comprising a steam supply source and at least one steam manifold coupled directly to, and upstream from, said liquid fuel supply manifold, to channel steam from said steam supply source to said liquid fuel nozzle via said at least one steam manifold and said liquid fuel supply manifold; and a chemical solvent-based purge system comprising a chemical solvent supply source and at least one chemical solvent manifold coupled directly to, and upstream from, said liquid fuel supply manifold to channel chemical solvent from said chemical solvent supply source to said liquid fuel nozzle via said at least one chemical solvent manifold and said liquid fuel supply manifold, wherein said steam purge system is operable after said chemical solvent-based purge system to facilitate removing chemical solvent from said liquid fuel supply manifold and said liquid fuel nozzle using steam channeled from said steam supply source via said at least one steam manifold.

6. The turbine engine in accordance with claim 5, wherein said steam supply source comprises a steam generator comprising at least one of:

a heat recovery steam generator; and an auxiliary boiler.

7. The turbine engine in accordance with claim 5, wherein said steam purge system further comprises at least one drain device coupled in flow communication with said at least one steam manifold and positioned between said steam supply source and said at least one combustor assembly.

8. A turbine engine assembly comprising a turbine engine compartment in which the turbine engine in accordance with claim 7 is disposed, wherein said at least one drain device is positioned external to said turbine engine compartment.

* * * * *